United States Patent
Westphal

(10) Patent No.: US 11,005,110 B2
(45) Date of Patent: May 11, 2021

(54) ENERGY SUPPLY SYSTEM FOR A CONSUMER UNIT AND METHOD FOR SUPPLYING ENERGY TO A CONSUMER UNIT

(71) Applicant: DIEHL STIFTUNG & CO. KG, Nuremberg (DE)

(72) Inventor: Robert Westphal, Wangen (DE)

(73) Assignee: Diehl Stiftung & Co. KG, Nuremberg (DE)

( * ) Notice: Subject to any disclaimer, the term of this patent is extended or adjusted under 35 U.S.C. 154(b) by 0 days.

(21) Appl. No.: 16/599,775

(22) Filed: Oct. 11, 2019

(65) Prior Publication Data

US 2020/0119369 A1 Apr. 16, 2020

(30) Foreign Application Priority Data

Oct. 11, 2018 (DE) .......................... 10 2018 008 072

(51) Int. Cl.
*H01M 6/36* (2006.01)
*H01M 6/50* (2006.01)
*H02J 3/32* (2006.01)

(52) U.S. Cl.
CPC ........... *H01M 6/36* (2013.01); *H01M 6/5038* (2013.01); *H02J 3/32* (2013.01); *H01M 2220/20* (2013.01)

(58) Field of Classification Search
CPC .................................. H01M 6/36; H02J 9/061
USPC ........................................................... 307/64
See application file for complete search history.

(56) References Cited

U.S. PATENT DOCUMENTS

| | | | |
|---|---|---|---|
| 3,639,773 A | 2/1972 | Ayd, III et al. | |
| 7,420,295 B2 | 9/2008 | Omae et al. | |
| 8,550,001 B2 | 10/2013 | Rastegar et al. | |
| 2005/0253458 A1* | 11/2005 | Omae | H01M 16/00 307/10.1 |
| 2008/0292945 A1 | 11/2008 | Kumar et al. | |
| 2012/0088134 A1* | 4/2012 | Wood | E21B 33/06 429/90 |
| 2013/0152811 A1 | 6/2013 | Rastegar | |

(Continued)

FOREIGN PATENT DOCUMENTS

| | | |
|---|---|---|
| CN | 107512149 A | 12/2017 |
| DE | 10059949 A1 | 7/2002 |

(Continued)

*Primary Examiner* — Joseph Chang
(74) *Attorney, Agent, or Firm* — Laurence A. Greenberg; Werner H. Stemer; Ralph E. Locher

(57) ABSTRACT

An energy supply system for a consumer unit with safety-relevant electronic consumers has an energy supply network with a main energy supply source for feeding electrical energy into the energy supply network in the normal operating mode of the energy supply system and an energy detection device for detecting the electrical energy being fed into the energy supply network by the main energy supply source. At least one thermal battery feeds electrical energy into the energy supply network in an emergency operating mode of the energy supply system if the electrical energy being fed into the energy supply network from the main energy supply source is insufficient. A controller switches the energy supply system into the emergency operating mode and activates the at least one thermal battery if the energy which is detected by the first energy detection device undershoots a predetermined threshold value.

15 Claims, 1 Drawing Sheet

(56) References Cited

U.S. PATENT DOCUMENTS

2013/0292130 A1 11/2013 Bennett et al.
2016/0298589 A1 10/2016 Setterberg et al.

FOREIGN PATENT DOCUMENTS

DE 102011115812 A1 4/2013
EP 2473817 B1 5/2013

* cited by examiner

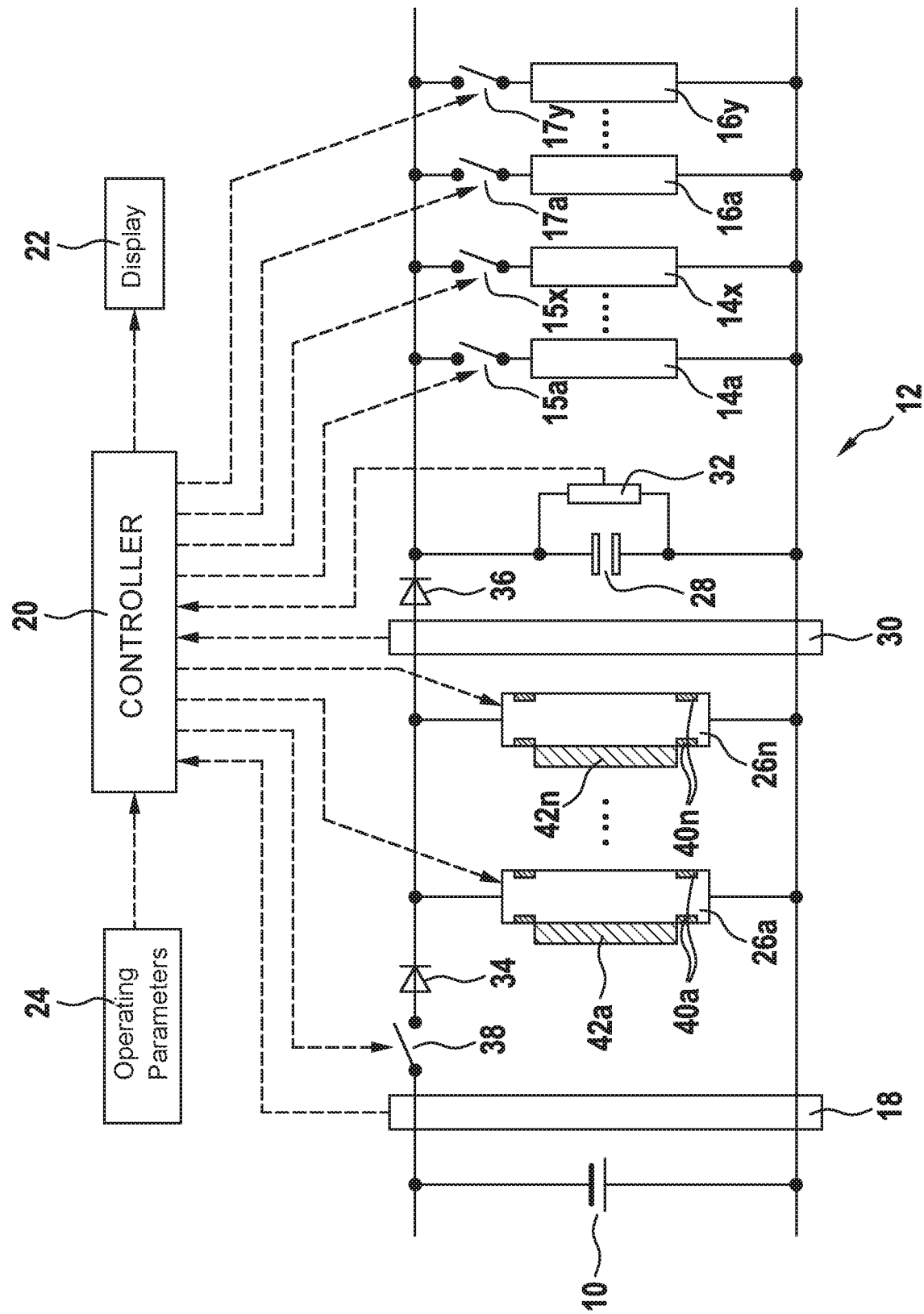

ENERGY SUPPLY SYSTEM FOR A CONSUMER UNIT AND METHOD FOR SUPPLYING ENERGY TO A CONSUMER UNIT

CROSS-REFERENCE TO RELATED APPLICATION

This application claims the priority, under 35 U.S.C. § 119, of German patent application DE 10 2018 008 072.3, filed Oct. 11, 2018; the prior application is herewith incorporated by reference in its entirety.

BACKGROUND OF THE INVENTION

Field of the Invention

The present invention relates to an energy supply system for a consumer unit with one or more safety-relevant electronic consumers, and to a method for supplying energy to a consumer unit with at least one safety-relevant electronic consumer.

The energy supply of safety-relevant electronic consumers is relevant in many consumer units, such as, for example, motor vehicles, lifts, technical medical systems etc., since the failure of the energy supply can bring about life-threatening situations. Emergency batteries which are used in conventional energy supply systems generally only have a low energy density and are therefore large and heavy and have to be charged regularly.

SUMMARY OF THE INVENTION

It is accordingly an object of the invention to provide an energy supply system and a method which overcome a variety of disadvantages of the heretofore-known devices and methods of this general type and which provides for an improved energy supply system for consumer units with safety-relevant electronic consumers.

With the foregoing and other objects in view there is provided, in accordance with the invention, an energy supply system for a consumer unit with one or more safety-relevant electronic consumers, the energy supply system comprising:

an energy supply network for connection to at east one safety-relevant electronic consumer;

a main energy supply source for feeding electrical energy into said energy supply network in a normal operating mode of the energy supply system;

a first energy detection device for detecting the electrical energy which is being fed into the energy supply network by said main energy supply source;

at least one thermal battery for feeding electrical energy into said energy supply network in an emergency operating mode of the energy supply system when the electrical energy to be fed into said energy supply network by said main energy supply source is insufficient; and a controller connected to said energy supply system and to said at least one thermal battery, said controller being configured to switch said energy supply system into the emergency operating mode and to activate said at least one thermal battery when the energy detected by said first energy detection device undershoots a predetermined threshold value.

In other words, the objects of the invention are achieved by an energy supply system for a consumer unit with one or more safety-relevant electronic consumers has an energy supply network to which at least one safety-relevant electronic consumer can be connected or is connected, a main energy supply source for feeding electrical energy into the energy supply network in the normal operating mode of the energy supply system and a first energy detection device for detecting the electrical energy which is fed into the energy supply network by the main energy supply source. According to the invention, the energy supply system also has at least one thermal battery for feeding electrical energy into the energy supply network in the emergency operating mode of the energy supply system if the electrical energy which can be fed into the energy supply network by the main energy supply source is insufficient, and a controller for switching the energy supply system into the emergency operating mode and activating the at least one thermal battery f the energy which is detected by the first energy detection device undershoots a predetermined limiting value.

According to the invention, it is proposed to use thermal batteries for the energy supply in the emergency operating mode if the main energy supply fails or is insufficient. Thermal batteries are distinguished by compactness, low weight, freedom from maintenance, reliability, high power density and energy density and low manufacturing costs. They are therefore particularly suitable for the use according to the invention as an emergency energy supply. The at least one thermal battery serves as an independent energy store which supplies, for a certain time, the energy which is necessary for the emergency. The use according to the invention of the thermal batteries is to be differentiated, for example, from compensation of the drive by a primary battery or a starting aid for a primary battery, for example for electric vehicles.

In the exemplary application of a motor vehicle as a consumer unit, the main energy supply source is, for example, a primary battery of the motor vehicle, the energy supply network is, for example, an on-board power system of the motor vehicle, and the safety-relevant electronic consumers are, for example, steering systems, brakes, electronic stability control systems (ESP), airbag controllers, emergency call systems, flashing warning light systems, steer-by-wire functions, brake-by-wire functions and the like. However, the energy supply system of the invention can also be advantageously used for other consumer units such as, for example, lifts, cableless lifts, cableways, technical medical products and systems, technical emergency products and systems and the like.

In one refinement of the invention, the at least one thermal battery is coupled to a heat exchanger which is connected to a heat source of the consumer unit. By means of this measure, the thermal battery can be preheated in the normal operating mode of the energy supply system, so that its activation period (time between ignition and the reaching of a stable supply voltage) can be shortened and the thermal battery can make available the required energy more quickly. Depending on the application of the invention, the thermal batteries can be preheated, for example, by the residual heat of a motor, an electrical heating system, a cooling water circuit, an oil circuit or an exhaust gas system of the motor vehicle. The thermal batteries are preferably preheated up to approximately 300° C.

In one refinement of the invention, the at least one thermal battery has a plurality of igniters which are preferably arranged in a distributed fashion and which are activated by the controller in order to activate the thermal battery. By means of this measure, it is also possible to shorten the activation period of the thermal battery so that the thermal battery can make available the required energy more quickly.

Moreover, the thermal battery itself is not the subject matter of the present invention. The energy supply system of the invention is rather not limited to a specific design or a specific method of functioning of the thermal battery.

A plurality of thermal batteries are preferably provided in the energy supply system. In this case, the controller is preferably configured to activate the plurality of thermal batteries sequentially in the emergency operating mode of the energy supply system. The duration of the possible energy supply of the safety-relevant electronic consumers in the emergency operating mode of the energy supply system can in this way be extended.

In this embodiment of the invention, the controller is preferably also configured to switch the energy supply system back into the normal operating mode and not to activate any further thermal batteries anymore if the energy which is detected by the first energy detection device exceeds a predetermined limiting value again. In other words, the not yet activated thermal batteries can be held in reserve for future emergency situations if the energy supply of the consumer unit can be made available again by the main energy supply source after a brief interruption.

In one refinement of the invention, the energy supply system also contains at least one capacitor which is connected in parallel with the at least one thermal battery and can be charged by the main energy supply source in the normal operating mode of the energy supply system. With this at least one capacitor, the activation period of the thermal battery can be covered in order to supply the safety-relevant consumers immediately with electrical energy from the charged capacitor. A plurality of capacitors and/or a capacitor bank are preferably provided.

In a further refinement of the invention, the energy supply system also has an operating parameter detection device for detecting at least one operating parameter of the consumer unit. In this case, the controller is preferably configured to switch the energy supply system into the emergency operating mode and to activate the at least one thermal battery only when the operating parameter which is detected by the operating parameter detection device exceeds or undershoots a predetermined limiting value. By means of this measure, certain operating states of the consumer unit (e.g. a stationary state of the motor vehicle, starting of a combustion engine etc.) can be prevented from unnecessarily triggering an emergency operating mode of the energy supply system. The operating parameters of the consumer unit which are monitored for this purpose are correspondingly, for example, a speed of a motor vehicle etc.

In a further refinement of the invention, the at least one thermal battery is mounted in a replaceable fashion in or on the consumer unit. For example, the thermal batteries can be mounted, for example under a closable lid, by means of a bayonet closure or screw closure. In the application of a motor vehicle, the thermal batteries can therefore easily be replaced in a workshop or refuelling station similarly, for example, to an oil filter.

In a further refinement of the invention, also at least one non-safety-relevant electronic consumer can be connected or is connected to the energy supply network. In this embodiment, a switch is preferably provided in series with this non-safety-relevant electronic consumer, and the controller is preferably configured to open the switch of the non-safety-relevant electronic consumer in the emergency operating mode of the energy supply system and therefore to disconnect it from the energy supply network, so that in the emergency operating mode of the energy supply system only the safety-relevant electronic consumers are supplied with electrical energy by the at least one thermal battery.

In yet another refinement of the invention in which at least one capacitor is connected in parallel with the at least one thermal battery, a switch is provided in series with the at least one safety-relevant electronic consumer, and also a second energy detection device is provided for detecting the electrical energy which is fed into the energy supply network by the at feast one thermal battery, and the controller is configured to open the switch of the safety-relevant electronic consumer in the emergency operating mode of the energy supply system in order to charge the at least one capacitor if the energy which is detected by the second energy detection device undershoots a predetermined limiting value. That is to say if the thermal battery can no longer make available sufficiently high energy for the safety-relevant consumers after a specific time period, at least the capacitor is to be charged again with the residual energy.

In yet another refinement of the invention, the energy supply system also has a display device which is connected to the controller in order to display the operating state of the energy supply system to a user of the consumer unit. With the display device it is possible to display to a user, in particular, the current operating mode (normal operating mode or emergency operating mode) or else a low energy level of the main energy supply source, a remaining energy supply time by the thermal batteries, a necessary replacement of thermal batteries and the like.

With the above and other objects in view there is also provided, in accordance with the invention, a method of supplying energy to a consumer unit with at least one safety-relevant electronic consumer connected to an energy supply network, the method comprising:

in a normal operating mode of the energy supply system, feeding electrical energy into the energy supply network from a main energy supply source;

monitoring the electrical energy that is being fed into the energy supply network from the main energy supply source;

switching the energy supply system into an emergency operating mode when the energy being fed into the energy supply network from the main energy supply source undershoots a predetermined threshold value;

in the emergency operating mode of the energy supply system, activating at least one thermal battery in order to feed electrical energy into the energy supply network.

With the method according to the invention for supplying energy to a consumer unit with at least one safety-relevant electronic consumer which is connected to an energy supply network, in the normal operating mode of the energy supply system electrical energy is fed into the energy supply network by a main energy supply source, the electrical energy which is fed into the energy supply network by the main energy supply source is monitored, switching over into an emergency operating mode of the energy supply system takes place if the energy which is fed into the energy supply network by the main energy supply source undershoots a predetermined limiting value, and in the emergency operating mode of the energy supply system at least one thermal battery is activated in order to feed electrical energy into the energy supply network.

With this energy supply method it is possible to achieve the same advantages as with the energy supply system of the invention as explained above. With respect to the advantages, preferred embodiments and concepts, reference is additionally made to the above explanations relating to the energy supply system.

In one refinement of the invention, the at least one thermal battery is preheated by a heat source of the consumer unit in the normal operating mode of the energy supply system. Alternatively or additionally, the at least one thermal battery is activated by a plurality of igniters, which are preferably arranged in a distributed fashion.

In one refinement of the invention, a plurality of thermal batteries are provided. In this case, this plurality of thermal batteries are preferably activated sequentially in the emergency operating mode of the energy supply system. In this embodiment, the energy supply system is preferably switched back into the normal operating mode, and no further thermal batteries are preferably activated anymore if the energy which can be fed into the energy supply network by the main energy supply source exceeds a predetermined limiting value again.

In one refinement of the invention, in an activation period of the thermal battery electrical energy is fed from at least one capacitor into the energy supply network, said capacitor being connected in parallel with the at least one thermal battery and being charged by the main energy supply source in the normal operating mode of the energy supply system.

In a further refinement of the invention, also at least one operating parameter of the consumer unit is monitored. In this case, the energy supply system is switched into the emergency operating mode and the at least one thermal battery is activated preferably only when the operating parameter exceeds or undershoots a predetermined limiting value.

In a further refinement of the invention, also at least one non-safety-relevant electronic consumer is connected to the energy supply network. In this embodiment, this at least one non-safety-relevant electronic consumer is preferably disconnected from the energy supply network in the emergency operating mode of the energy supply system.

In another embodiment of the invention, in the emergency operating mode of the energy supply system at least one capacitor, which is connected in parallel with the at least one thermal battery, is charged by the at least one thermal battery if the energy which is fed into the energy supply network by the at least one thermal battery undershoots a predetermined limiting value.

In yet a further refinement of the invention, the operating state of the energy supply system can be displayed to a user of the consumer unit.

Other features which are considered as characteristic for the invention are set forth in the appended claims.

Although the invention is illustrated and described herein as embodied in an energy supply system for a consumer unit and method for supplying energy to a consumer unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The sole FIGURE of the drawing shows, for the most part in a schematic form, a circuit diagram of an energy supply system according to an exemplary embodiment of the present invention.

DETAILED DESCRIPTION OF THE INVENTION

Referring now to the FIGURE of the drawing in detail there is shown an exemplary embodiment of an energy supply system according to the present invention. The embodiment will be described below in more detail using the example of a motor vehicle as a consumer unit.

In the field of motor vehicles, Standard ISO 26262 defines various safety requirement levels (Automotive Safety Integrity Level, ASIL) for safety-relevant systems. In motor vehicles up to ASIL 3, the driver still bears full responsibility and carries out the steering of the vehicle; in an emergency an energy supply is required for 10 to 30 seconds in order to safely bring the motor vehicle to a standstill at the side of the road. In motor vehicles according to ASIL 4 (automated vehicle guidance) or ASIL 5 (completely autonomous driving), in an emergency an energy supply is required for approximately 5 minutes in order to gain the driver's attention and safely bring the motor vehicle to a standstill. In order to implement a comfort function, in an emergency an energy supply is required for 15 to 30 minutes in order to drive the motor vehicle to a workshop or to a safe location. The energy supply system of the invention is also suitable to be able to realize modern motor vehicles with high safety requirement levels.

The energy supply system in FIG. 1 contains a main energy supply source 10, for example the primary battery of the motor vehicle, which, in the normal operating mode, feeds electrical energy into an energy supply network 12, for example the on-board power system of the motor vehicle. A plurality of safety-relevant electronic consumers 14a . . . x, for example steering systems, brakes, electronic stability control system (ESP), airbag controllers, emergency call systems, flashing warning light systems, steer-by-wire functions, brake-by-wire functions and the like, as well as a plurality of non-safety-relevant electronic consumers 16a . . . y, for example air-conditioning systems, entertainment media and the like, are connected to the energy supply network 12. The safety-relevant consumers 14 . . . x are optionally each connected to the energy supply network 12 via a switch 15a . . . x, so that when necessary they can be disconnected therefrom. The non-safety-relevant consumers 16a . . . y are each connected to the energy supply network 12 via a switch 17a . . . y, so that when necessary, and in particular in the emergency operating mode of the energy supply system, they can be disconnected from the energy supply network 12.

The energy which is fed into the energy supply network 12 by the main energy supply source 10 is monitored by means of a first energy detection device 18. The first energy detection device 18 is connected to a controller 20 for actuating the energy supply system and the switches 15a . . . x, 17a . . . y of the consumers 14a . . . x, 16a . . . y. The controller 20 is additionally connected to a display device 22, in order to be able to display information about the operating state of the energy supply system (visual and/or acoustic) to a user of the motor vehicle. The controller 20 is preferably also connected to an operating parameter detection device 24, in order to detect operating parameters of the motor vehicle such as, for example, the vehicle speed. The controller 20 can be, for example, an ECU (Electronic Control Unit) which is present in any case in the motor vehicle, or suitable electronics of the energy supply system.

As illustrated in the FIGURE, the energy supply system also contains a plurality of thermal batteries 26a . . . n for feeding electrical energy into the energy supply network 12 in the emergency operating mode of the energy supply system. Thermal batteries are distinguished by compactness, low weight, freedom from maintenance, high reliability, high power density and energy density and low manufacturing costs. The thermal batteries 26a . . . n are mounted in a replaceable fashion in or on the motor vehicle, for example in the engine cavity of the motor vehicle, under a closable lid by means of bayonet closures or screw closures, for example. Therefore, the thermal batteries 26a . . . n can, when necessary, be easily replaced similarly to, for example, an oil filter in a workshop or refuelling station.

The design and method of functioning of thermal batteries are basically known to a person skilled in the art, for which reason in this context a more detailed description will not be given. Basically any desired thermal batteries can be used for the energy supply system of the invention.

Furthermore, the energy supply system contains at least one capacitor 28 which is connected in parallel with the thermal batteries 26a . . . n. This at least one capacitor 28 is charged in the normal operating mode of the energy supply system by the main energy supply source 10, and it can feed electrical energy into the energy supply network 12 in the emergency operating mode of the energy supply system, in order to cover an activation period of the thermal batteries 26a . . . n (time between ignition and the reaching of a stable supply voltage), of, for example, approximately 50 ms to 500 ms. Voltage dips below 50 ms can be covered, for example, with an aluminium-electrolyte capacitor which is distinguished by rapid and high outputting of power and a wide operating temperature range. For coverages in the range of seconds, preferably double-layer capacitors (supercaps or ultracaps) can be used, and for a plurality of seconds preferably capacitor banks can be used. For the at least one capacitor 28 of this energy supply system it is optionally also possible to use a recuperation capacitor bank which is possibly already present.

The energy supply system preferably contains a second energy detection device 30 for monitoring the electrical energy which is fed into the energy supply network 12 by the thermal batteries 26a . . . n. The energy supply system preferably also contains a voltage detection device 32 for monitoring the state of charge of the capacitor 28.

As illustrated in the FIGURE, a diode 34 is provided in the energy supply network 12 between the main energy supply source 10 and the thermal batteries 26a . . . n, and a diode 36 is provided between the thermal batteries 26a . . . n and the electronic consumers 14a . . . x, 16a . . . y. Furthermore, optionally a switching element 38 is provided in the energy supply network 12 between the main energy supply source 10 and the thermal batteries 26a . . . n, in order to be able to disconnect the main energy supply source 10 from the energy supply network 12 in the emergency operating mode of the energy supply system.

As indicated in the FIGURE, the thermal batteries 26a . . . n preferably each have a plurality of igniters 40a . . . n which are arranged in a distributed fashion and which can be actuated by the controller 20 in order to activate the thermal batteries 26a . . . n. By means of this plurality of igniters 40a . . . n, the activation period of the thermal batteries 26a . . . n can be shortened so that the thermal batteries 26a . . . n can make available the required energy more quickly in the emergency operating mode. Alternatively or additionally, the thermal batteries 26a . . . n are also coupled to heat exchangers 42a . . . n which are connected to a heat source of the consumer unit, for example a motor, an electric heating system, a cooling water circuit, an oil circuit or an exhaust gas system of the motor vehicle, so that the thermal batteries 26a . . . n can be preheated in the normal operating mode of the energy supply system, in order then to shorten their activation period when switching into the emergency operating mode. The thermal batteries 26a . . . n can be preheated, for example, up to approximately 300° C.

The method of functioning of this energy supply system is, for example, as follows: in the event of a failure or insufficient power of the main energy supply source 10, which is detected by the first energy detection device 18, the controller 20 switches the energy supply system into the emergency operating mode for, for example, more than 500 ms. In this context, specific operating states of the vehicle such as, for example, a stationary state of the vehicle or starting of the combustion engine are, however, not intended to trigger the emergency operating mode, which can be achieved by monitoring corresponding operating parameters with the operating parameter detection device 24.

When switching into the emergency operating mode of the energy supply system takes place, the controller disconnects the main energy supply source 10 and the non-safety-relevant consumers 16a . . . y from the energy supply network 12 by opening the corresponding switches 38 and/or 17a . . . y, and activates the first thermal battery 26a by actuating their igniters 40a. During the activation period of the first thermal battery 26a, electrical energy is fed into the energy supply network 12 from the at least one capacitor 28, and then subsequently from the first thermal battery 26a. The time of the activation of the first thermal battery 26a can be optimized by monitoring the state of charge of the at least one capacitor 28 by means of the voltage detection device 32.

The plurality of thermal batteries 26a . . . n are activated sequentially by the controller 20 in the emergency operating mode of the energy supply system. In good time before the end of the power of the active thermal battery, the next thermal battery is activated by the controller 20, in order to ensure as far as possible an uninterrupted feed of energy into the energy supply network 12. If the main energy supply source 10 can in the meantime make available sufficient energy again, which is detected by the first energy detection device 18, the further thermal batteries are, however, no longer activated but instead switching back again into the normal operating mode of the energy supply system takes place.

If an activated thermal battery 26a . . . n can no longer output sufficiently high power after a specific time period of, for example, approximately 300 seconds, which is detected by the second energy detection device 30, the at least one capacitor 28 can still be charged again with the residual energy of this thermal battery. In this phase, the safety-relevant consumers 14a . . . x are also disconnected briefly from the energy supply network 12 by means of the switches 15a . . . x.

The following is a summary list of reference numerals and the corresponding structure used in the above description of the invention:

10 Main energy supply source
12 Energy supply network
14a . . . x Safety-relevant electronic consumers
15a . . . x Switches
16a . . . y Non-safety-relevant electronic consumers
17a . . . y Switches
18 First energy detection device
20 Controller
22 Display device
24 Operating parameter detection device
26a . . . n Thermal battery
28 Capacitor or capacitor bank
30 Second energy detection device
32 Voltage detection device
34 Diode
36 Diode
38 Switching element
40a . . . n Igniters
42a . . . n Heat exchangers

The invention claimed is:

1. An energy supply system for a consumer unit with one or more safety-relevant electronic consumers, the energy supply system comprising:
an energy supply network for connection to at least one safety-relevant electronic consumer;
a main energy supply source for feeding electrical energy into said energy supply network in a normal operating mode of the energy supply system;
a first energy detection device for detecting the electrical energy which is being fed into the energy supply network by said main energy supply source;
at least one thermal battery for feeding electrical energy into said energy supply network in an emergency operating mode of the energy supply system when the electrical energy to be fed into said energy supply network by said main energy supply source is insufficient;
a controller connected to said energy supply system and to said at least one thermal battery, said controller being configured to switch said energy supply system into the emergency operating mode and to activate said at least one thermal battery when the energy detected by said first energy detection device undershoots a predetermined threshold value;
at least one capacitor connected in parallel with said at least one thermal battery;
a switch connected in series with said at least one safety-relevant electronic consumer;
a second energy detection device for detecting the electrical energy being fed into the energy supply network from said at least one thermal battery; and
wherein said controller is configured to open said switch of the safety-relevant electronic consumer in the emergency operating mode of the energy supply system in order to charge said at least one capacitor when the energy detected by said second energy detection device undershoots a predetermined limiting value.

2. The energy supply system according to claim 1, wherein said at least one thermal battery is coupled to a heat exchanger that is connected to a heat source of the consumer unit.

3. The energy supply system according to claim 1, wherein said at least one thermal battery includes a plurality of igniters that are activated by said controller in order to activate said at least one thermal battery.

4. The energy supply system according to claim 1, wherein said at least one thermal battery is one of a plurality of thermal batteries and said controller is configured to activate said plurality of thermal batteries sequentially in the emergency operating mode of the energy supply system.

5. The energy supply system according to claim 1, further comprising an operating parameter detection device for detecting at least one operating parameter of the consumer unit, and wherein said controller is configured to switch the energy supply system into the emergency operating mode and to activate said at least one thermal battery only when the at least one operating parameter detected by said operating parameter detection device exceeds or undershoots a predetermined limiting value.

6. The energy supply system according to claim 1, wherein said at least one thermal battery is replaceably mounted in or on the consumer unit.

7. The energy supply system according to claim 1, wherein at least one non-safety-relevant electronic consumer is connected, or is to be connected, to the energy supply network, and wherein the energy supply system further comprises a switch connected in series with the non-safety-relevant electronic consumer, and said controller is configured to open said switch of the non-safety-relevant electronic consumer in the emergency operating mode of the energy supply system.

8. A method of supplying energy to a consumer unit with at least one safety-relevant electronic consumer connected to an energy supply network, the method comprising:
in a normal operating mode of the energy supply system, feeding electrical energy into the energy supply network from a main energy supply source;
monitoring the electrical energy that is being fed into the energy supply network from the main energy supply source;
switching the energy supply system into an emergency operating mode when the energy being fed into the energy supply network from the main energy supply source undershoots a predetermined threshold value;
in the emergency operating mode of the energy supply system: activating at least one thermal battery in order to feed electrical energy into the energy supply network, detecting the electrical energy being fed into the energy supply network from the at least one thermal battery, and if the detected electrical energy undershoots a predetermined limiting value, opening a switch connected in series with the at least one safety-relevant electronic consumer in order to charge at least one capacitor, which is connected in parallel with the at least one thermal battery, by the at least one thermal battery.

9. The method according to claim 8, which further comprises preheating the at least one thermal battery by a heat source of the consumer unit in the normal operating mode of the energy supply system.

10. The method according to claim 8, which comprises activating the at least one thermal battery by a plurality of igniters.

11. The method according to claim 8, wherein the at least one thermal battery is one of a plurality of thermal batteries, and the activating step comprises sequentially activating the plurality of thermal batteries in the emergency operating mode of the energy supply system.

12. The method according to claim 8, which comprises, during an activation period of the thermal battery, feeding the electrical energy from at least one capacitor into the energy supply network, the capacitor being connected in parallel with the at least one thermal battery and being charged by the main energy supply source during the normal operating mode of the energy supply system.

13. The method according to claim 8, which further comprises also monitoring at least one operating parameter of the consumer unit, and switching the energy supply system into the emergency operating mode and activating the at least one thermal battery only when the operating parameter exceeds or undershoots a predetermined limiting value.

14. The method according to claim 8, wherein at least one non-safety-relevant electronic consumer is connected to the energy supply network, and the method comprises disconnecting the at least one non-safety-relevant electronic consumer from the energy supply network in the emergency operating mode of the energy supply system.

15. An energy supply system for a consumer unit with one or more safety-relevant electronic consumers, the energy supply system comprising:

an energy supply network for connection to at least one safety-relevant electronic consumer;

a main energy supply source for feeding electrical energy into said energy supply network in a normal operating mode of the energy supply system;

a first energy detection device for detecting the electrical energy which is being fed into the energy supply network by said main energy supply source;

at least one thermal battery for feeding electrical energy into said energy supply network in an emergency operating mode of the energy supply system when the electrical energy to be fed into said energy supply network by said main energy supply source is insufficient; and a controller connected to said energy supply system and to said at least one thermal battery, said controller being configured to switch said energy supply system into the emergency operating mode and to activate said at least one thermal battery when the energy detected by said first energy detection device undershoots a predetermined threshold value, wherein at least one non-safety-relevant electronic consumer is connected, or is to be connected, to the energy supply network, and the energy supply system further comprises a switch connected in series with the non-safety-relevant electronic consumer; and wherein said controller is configured to open said switch of the non-safety-relevant electronic consumer in the emergency operating mode of the energy supply system.

* * * * *